J. W. HOOVER.
CORN TOPPER.
APPLICATION FILED JAN. 8, 1912.

1,099,501.

Patented June 9, 1914.
2 SHEETS—SHEET 1.

Witnesses

J. W. Hoover,
Inventor by C. A. Snow & Co.
Attorneys

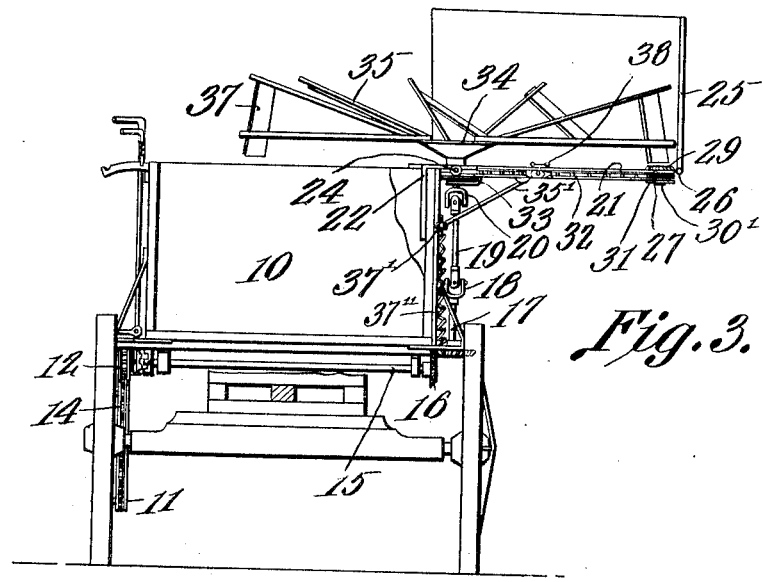
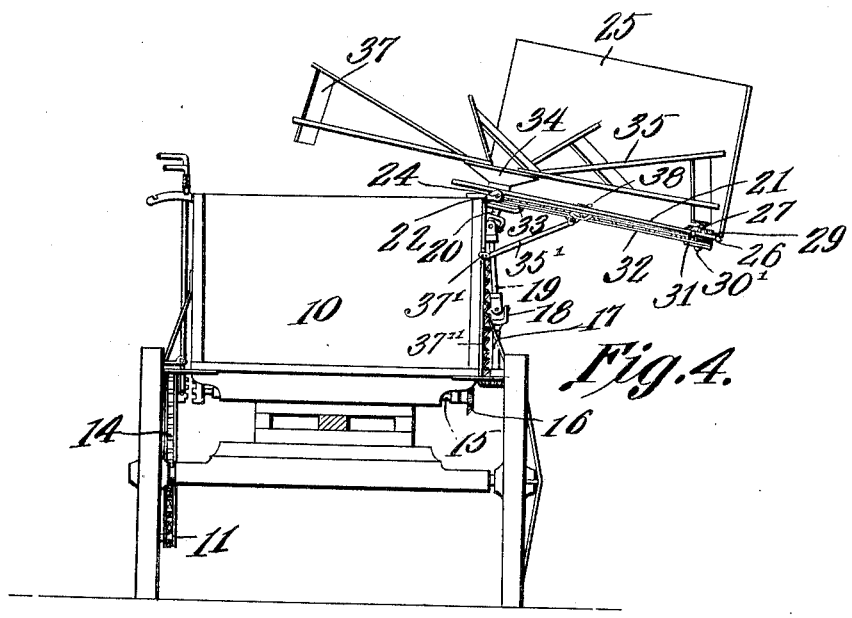

UNITED STATES PATENT OFFICE.

JOSEPH W. HOOVER, OF WINFIELD, KANSAS.

CORN-TOPPER.

1,099,501.

Specification of Letters Patent. Patented June 9, 1914.

Application filed January 8, 1912. Serial No. 670,005.

*To all whom it may concern:*

Be it known that I, JOSEPH W. HOOVER, a citizen of the United States, residing at Winfield, in the county of Cowley and State of Kansas, have invented a new and useful Corn-Topper, of which the following is a specification.

This invention relates to corn headers.

The primary object of the present invention is to provide a corn header which may be mounted upon a suitable vehicle, the cutting and feeding mechanism of said header being operated by the vehicle on which the same is mounted.

A further object of the invention is to provide means for conveying the seed which falls from the corn, as the same is cut, to the vehicle.

Figure 1:
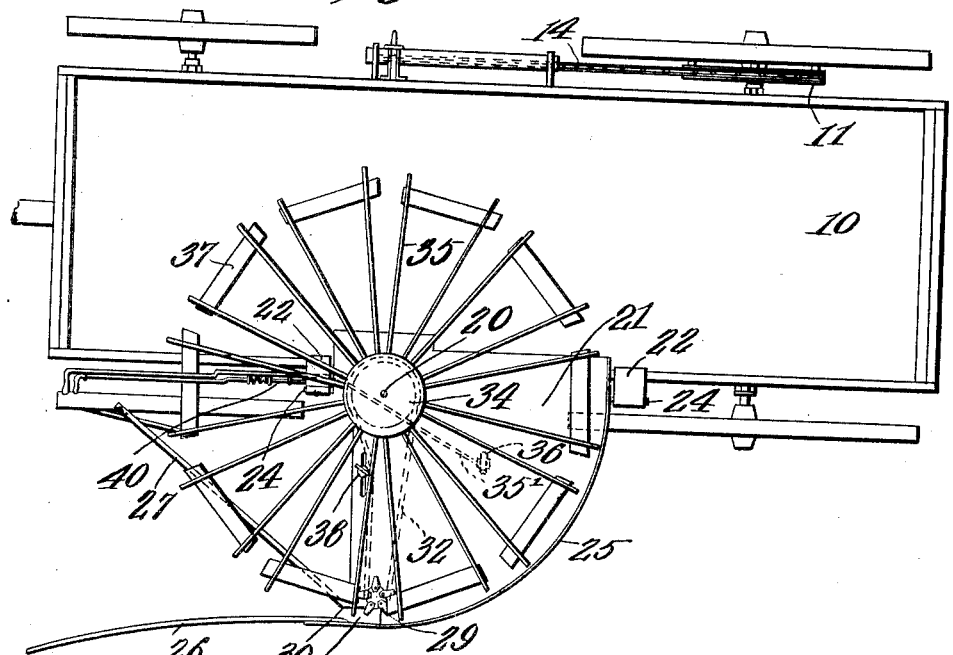
Figure 2:
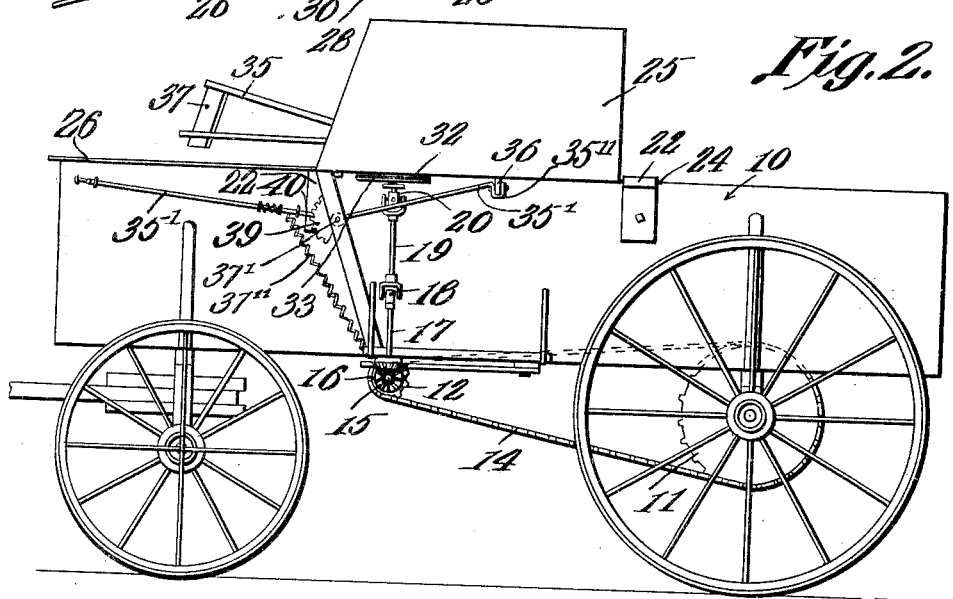

In the drawings:—Figure 1 is a top plan view. Fig. 2 is a side elevation. Fig. 3 is a front elevation. Fig. 4 is a view showing the mechanism tilted to vary the height of the cut.

In the drawings, 10 designates the vehicle. One wheel of this vehicle is provided with a sprocket 11 which drives a smaller sprocket 12 by means of the chain 14. The sprocket 12 is mounted on the shaft 15, a beveled pinion 16 being arranged on the end of said shaft remote from the sprocket 12. Disposed vertically and at a point adjacent one side of the wagon body is a shaft 17 which is connected by means of the universal joint 18 to the shaft 19 which is similarly connected with a shaft 20. Hingedly supported by one of the side walls of the wagon is a plate 21, said plate being supported by the brackets 22 carried by the wagon, the shafts 24 which are secured to the plate 21 being supported to rotate by said brackets. The plate 21 is provided with the curved shield 25, and extending from said shield are a plurality of flexible guide members 26 and 27 said members being flared to deflect the stalks within the recess 28 formed in the plate 21. Supported for rotation adjacent said recess is a rotary cutter 29 which traverses the space between the edge 30 of the plate and the guard member 26, the heads falling on the plate 21 the seed which is loosened by the contact of the knife with the stalk being prevented from rolling off of said plate by the guard 25. The rotary cutter 29 is supported on a shaft 30′, said shaft being provided with the sprocket 31 which is driven by the chain 32 which passes over said sprocket and the sprocket 33 mounted on the shaft 20, this sprocket chain is tightened by means of the tightener 38 which is supported by the plate 21. Arranged on said shaft is a hub member 34 and extending from said member are a plurality of spokes 35. Every other one of these spokes is disposed in the same longitudinal plane as the hub member while the intermediate spokes extend upwardly, the spokes being disposed in pairs which are connected adjacent their ends by wipers 37, the end portions of said wipers extending beyond the lowermost spoke, contacting with the plate 21 to wipe the loosened seed which falls from the heads into the wagon. It will be noted by this construction, that as the wagon travels forward, the flared guide fingers 26 and 27 will direct the stalks into the recess 28, the wipers forcing the same into contact with the rotary cutter which severs the heads, the wipers carrying the heads to the wagon.

The plate 21 is supported by an arm 35′, said rod or arm being formed with the offset end 35″, which supports a roller 36, on which the plate 21 rests. The arm 35′ is pivotally secured to the wagon body and extends toward the front end of the same where it may be conveniently manipulated by the driver. The roller 36 is maintained in contact with the plate by means of the coiled spring 37″ which is connected to said rod and to the wagon body, said spring having a tendency to swing the rod upon its pivot to force said roller in contact with the plate 21. The segment 39 is secured adjacent the point where the rod is secured, said segment being engaged by the spring pressed dog 40. It will be noted by this construction, that as the arm 35′ is raised or lowered, the roller 36 will contact with the plate, to support the same at any desired angle to vary the height of cut. It will therefore be seen that the driver may conveniently regulate the height of cut, while the vehicle is in motion by drawing the dog out of contact with the segment, and adjusting the arm 35′. It will also be noted that the structure is such as may be easily and economically manufactured, the various parts being readily assembled.

What is claimed is:—

1. The combination with a wagon body, of a corn header comprising a plate hingedly supported on the wagon body, a guard shield extending partially around the outer periphery thereof, a rotary cutter supported by said plate, means for directing stalks into the path of said rotary cutter, a wiper including a rotatable hub mounted adjacent the edge of said wagon body and supported by said plate, wiper plates rigidly secured to said rotatable hub, the path of rotation extending directly above the interior of said wagon body so as to deliver material directly thereto.

2. A corn header comprising a wagon body, a plate hingedly supported by said wagon body, a rotary cutter supported by said plate, a rotatable hub supported by said plate, spokes extending therefrom and adapted to rotate in a plane parallel to the plane of said plate, wiper plates rigidly secured to said spokes with the longitudinal axes thereof extending perpendicular to radial lines taken with the hub as a center, the longitudinal axes of said wiper plates extending at an angle to the plane of the said plate.

3. A corn header comprising a wagon body, a plate hingedly supported by said wagon body, a rotary cutter supported by said plate, a shaft extending adjacent to the edge of said wagon body and perpendicular to the said plate, wiper plates rotatably supported by said shaft and rotating in a plane parallel to the plane of the said plate, the said wiper plates positioned substantially at right angles to radial lines taken with the said shaft as a center, said wiper plates inclined at an angle to the said hingedly supported plate and dipping downwardly toward their front ends.

4. A corn header comprising a wagon body, a plate hingedly secured to one side thereof, an upright guard shield extending partially around the outer periphery of said plate, a rotary cutter positioned adjacent the outer periphery of said plate, flexible guide fingers rigidly secured to the said plate adjacent the rotary cutter and diverging outwardly therefrom adapted to direct stalks in the path of the said rotary cutter, a wiper including a rotatable hub mounted adjacent the inner edge of the said hingedly mounted plate, outstanding spokes rigidly secured to said hub, the alternating spokes extending obliquely upwardly, the intermediate ones extending horizontally, wiper plates rigidly secured to the alternate and intermediate spokes and extending at an angle to the hingedly mounted plate, said rotatable wiper adapted to wipe the stalks cut by the said rotary cutter from the said hingedly mounted plate into the wagon body above which the said spokes and wiper plates extend.

In testimony that I claim the foregoing as my own, I have hereto affixed my signature in the presence of two witnesses.

JOSEPH W. HOOVER.

Witnesses:
W. C. ROBINSON,
E. W. BALINGER.